US011063892B2

(12) United States Patent
Fogu

(10) Patent No.: US 11,063,892 B2
(45) Date of Patent: Jul. 13, 2021

(54) MITIGATION OF BULLYING AND OBJECTIONABLE CONTENT

(71) Applicant: Facebook, Inc., Menlo Park, CA (US)

(72) Inventor: Francesco Fogu, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 52 days.

(21) Appl. No.: 16/544,793

(22) Filed: Aug. 19, 2019

(65) Prior Publication Data
US 2020/0403947 A1 Dec. 24, 2020

Related U.S. Application Data

(60) Provisional application No. 62/863,229, filed on Jun. 18, 2019.

(51) Int. Cl.
*H04L 12/58* (2006.01)
*G06Q 50/00* (2012.01)
*G06F 40/242* (2020.01)
*H04L 29/08* (2006.01)

(52) U.S. Cl.
CPC ............. *H04L 51/12* (2013.01); *G06Q 50/01* (2013.01); *H04L 51/22* (2013.01); *H04L 51/32* (2013.01); *G06F 40/242* (2020.01); *H04L 67/303* (2013.01); *H04L 67/306* (2013.01)

(58) Field of Classification Search
CPC ....... H04L 51/063; H04L 51/14; H04L 51/16; G06F 40/106; G06Q 50/01; H04W 4/18
See application file for complete search history.

(56) References Cited

U.S. PATENT DOCUMENTS

| 8,645,825 | B1 | 2/2014 | Cornea et al. | |
|---|---|---|---|---|
| 2014/0304341 | A1 | 10/2014 | Hsu | |
| 2016/0294753 | A1* | 10/2016 | Centner | H04L 51/12 |
| 2016/0342571 | A1* | 11/2016 | Lane | G06Q 10/103 |
| 2017/0102783 | A1* | 4/2017 | Shikii | G06F 3/012 |
| 2018/0349796 | A1 | 12/2018 | Gibbs et al. | |
| 2019/0052724 | A1* | 2/2019 | Dancel | H04L 63/107 |
| 2019/0207903 | A1* | 7/2019 | Deac | H04L 67/303 |
| 2019/0230170 | A1* | 7/2019 | Marlin | G06F 40/242 |
| 2019/0273707 | A1* | 9/2019 | Deac | H04L 51/32 |

OTHER PUBLICATIONS

The PCT Search Report and Written Opinion dated Aug. 28, 2020 for PCT application No. PCT/US2020.037322, 14 pages.

* cited by examiner

Primary Examiner — Barbara B Anyan
(74) Attorney, Agent, or Firm — Lee & Hayes, P.C.

(57) ABSTRACT

Techniques are described that allow a user to control and/or restrict dissemination of content by other users related to an account of the user. For example, a request may be received, from a first user account, to restrict presentation of content having a characteristic and received from a second user account. An item of content having the characteristic may be received from the second user account. A first instruction to present a first representation of the item of content is sent to a first computing device associated with the first user account and based at least in part on the request to restrict presentation. A second instruction to present a second representation of the item of content is sent to a second computing device associated with the second user account, the second representation of the item of content being different than the first representation of the item of content.

20 Claims, 11 Drawing Sheets

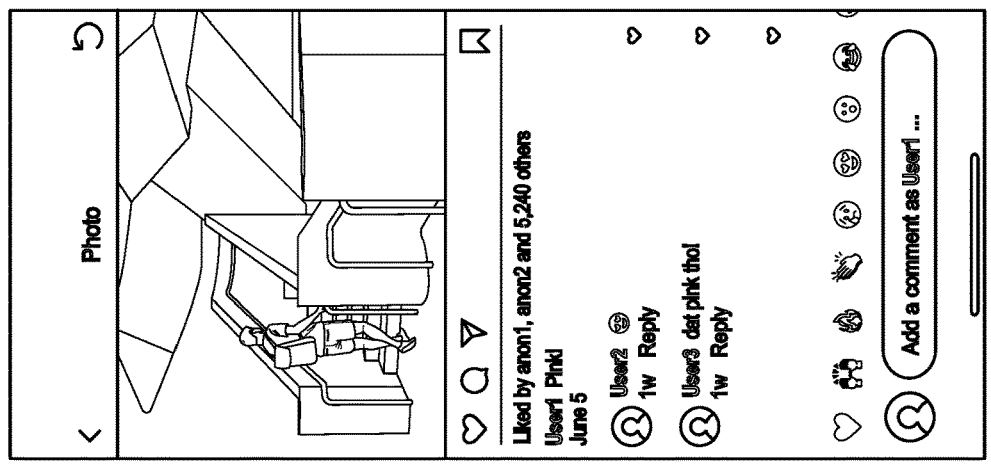

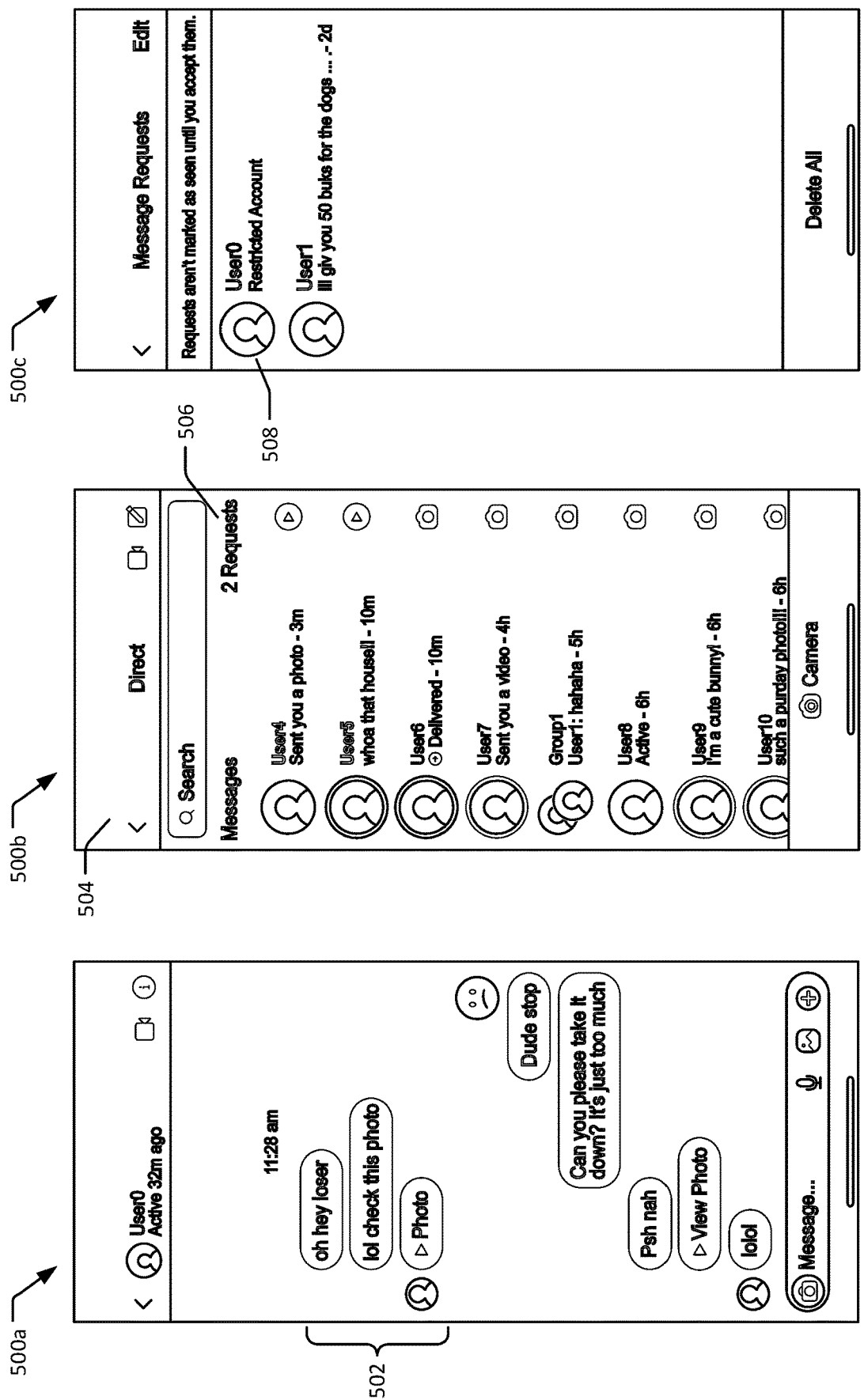

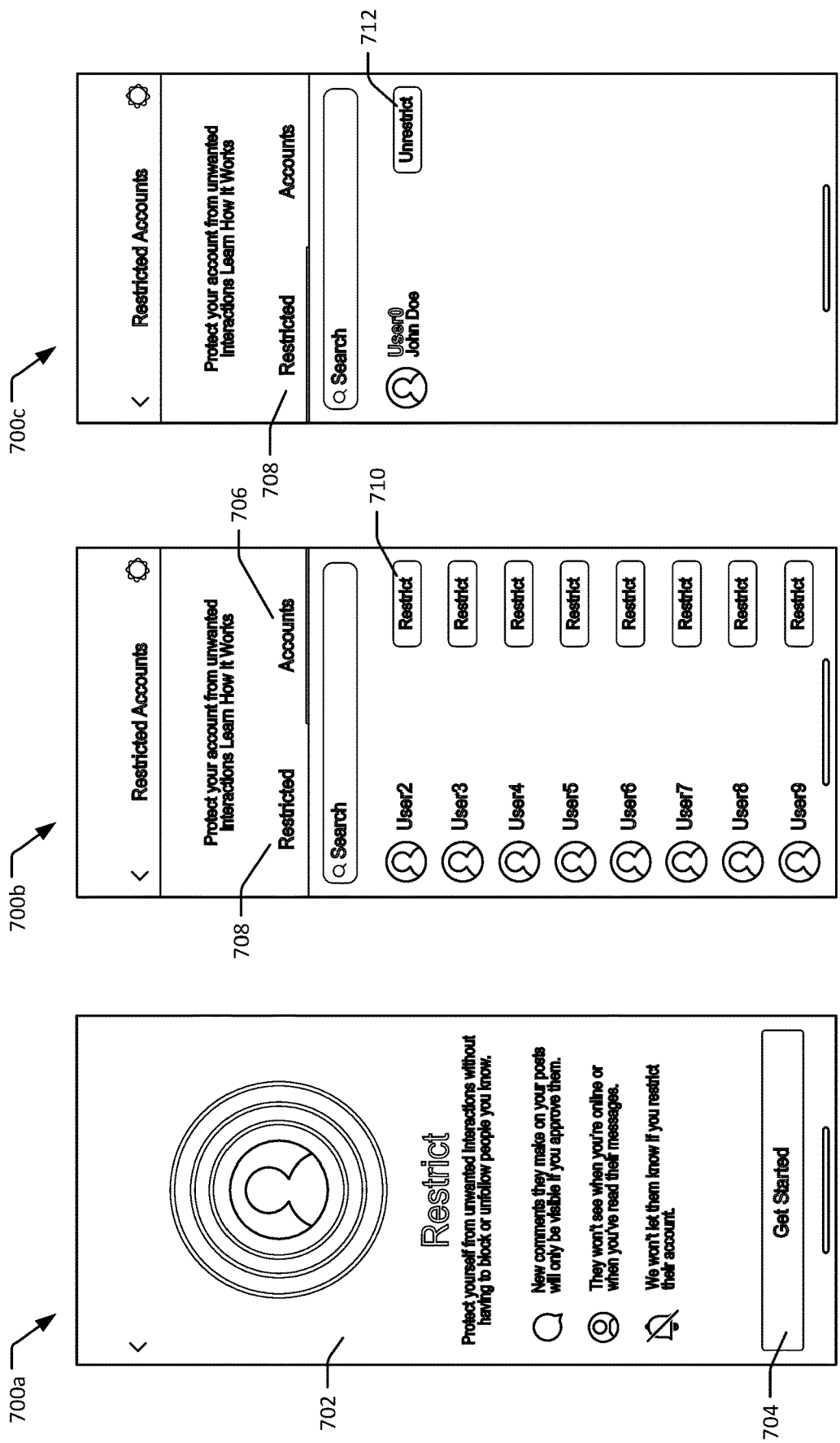

MITIGATION OF BULLYING AND OBJECTIONABLE CONTENT

This application claims the benefit of priority to U.S. Provisional Application No. 62/863,229, filed Jun. 18, 2019, which is incorporated herein by reference.

BACKGROUND

Bullying, such as aggressive or unwanted behavior, can have serious and lasting consequences for both the bully and his or her victims. Bullying includes behavior that involves a real or perceived power imbalance between bully and victim. Bullying can include physical, verbal, and/or social bullying, and can be done in person or via one or more digital platforms (e.g., text messaging, instant messaging, email, social media, gaming, or other applications) by which users can share content. Bullying done via one or more digital platforms, often referred to as cyberbullying, has become increasingly prevalent and can include, among other things, sending, posting, or sharing negative, harmful, false, mean, or otherwise objectionable content to or about another user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4F illustrate example interfaces enabling a user to view and approve or disapprove comments posted by a restricted account.

FIG. 5A-5F illustrate example interfaces enabling a user to view messages sent by a restricted account without notifying the restricted account of the restriction and/or that the messages have been read.

FIGS. 7A-7C illustrate example interfaces usable to set and manage restricted account.

DETAILED DESCRIPTION

Figure 1:
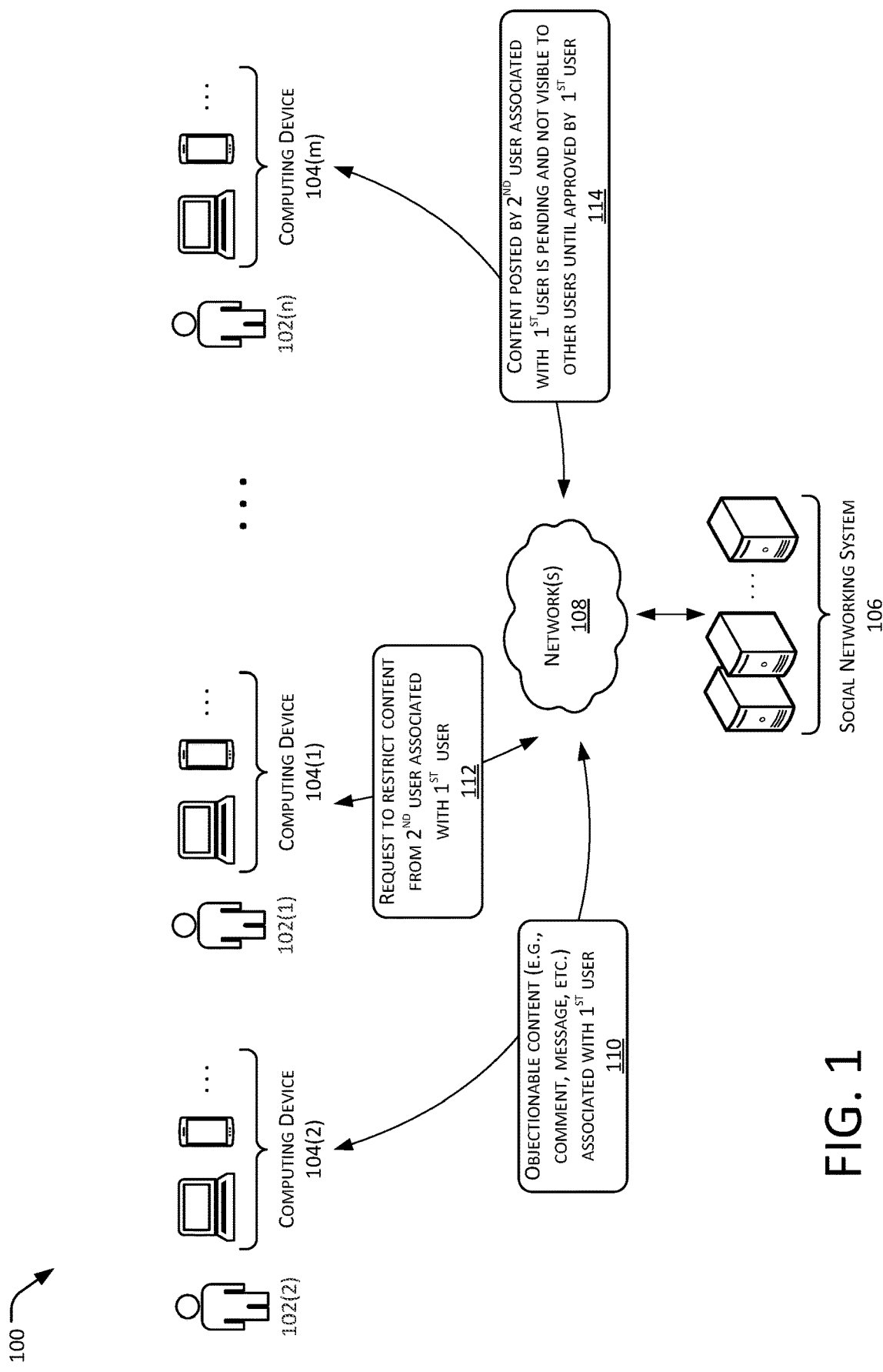
FIG. 1 is a schematic view of an example system usable to implement example techniques described herein.

As discussed above, cyberbullying has become increasingly prevalent and poses a significant risk to users. Cyberbullying has been found to have serious and lasting consequences for both the bully and his or her victims including depression, substance use, and suicide. Existing options for a victim to combat cyberbullying have been inadequate. For instance, previously, a victim's options for combatting cyberbullying included ceasing to use the digital platform on which the cyberbullying is occurring, blocking or otherwise disassociating from the bully on the digital platform, or confronting to bully on the digital platform or in person. Each of these options has drawbacks. For instance, in the case of ceasing to use the digital platform, the victim is denied the benefits of the digital platform, is unable to monitor what is being said about him or her on the digital platform, and has no control over content the bully may post about him or her on the digital platform. In the case of blocking or dissociating from the bully, the victim may lose the ability to monitor what the bully is saying about him or her on the digital platform, and the bully may become aware that he or she has been blocked which may incite the bully to take retaliatory action. In the case of confronting to bully, the victim runs the risk of inciting the bully to inflict additional emotional or physical harm.

This application describes techniques for empowering a victim of cyberbullying to control the extent to which a bully can disseminate negative, harmful, false, mean, or otherwise objectionable content to or about them via a digital platform. In some examples, the techniques described herein may allow the victim to request that the bully be designated as being "restricted" to mitigate the ability of the bully to disseminate objectionable content about the victim. The techniques described herein may allow the victim to monitor content sent, posted, or shared by the restricted bully to or about the victim, and may allow the victim to decide whether or not to approve the content. The techniques described herein may be implemented without notifying the bully, thereby avoiding inciting the bully. For instance, in some examples, once a first user (the victim) has designated a second user (the bully) as being restricted, the content disseminated by the second user (the bully) may appear "live" to the second user (e.g., may appear to have been sent, posted, shared, etc.), but may not be made visible to other users (e.g., contacts or other third parties) and may stay in a pending state until the first user (the victim) reviews and approves or disapproves the content. If the first user (the victim) approves the content, it will be made visible to other users. If the first user (the victim) disapproves the content, the content may continue to appear "live" to the second user (the bully), but will be removed from the first user's (the victim's) digital platform and will not be visible to other users (e.g., contacts or other third parties). Additionally or alternatively, the digital platform may apply "friction" to make it more difficult for the second user (the bully) to disseminate content to or about the first user (the victim) by, for example, requiring the second user to enter a more complete user name or other designation of the first user when disseminating content to or about the first user. Applying these techniques, the digital platform allow users to limit content that they deem to be bullying or otherwise objectional from being disseminated to or about them. Moreover, these techniques can be implemented without putting the bully on notice, thereby allowing the victim to mitigate the situation without inciting the bully.

In some examples, a social networking system may receive, from a first computing device associated with a first user account, a request to restrict presentation of content having a characteristic, where the content is received from a second user account. The social networking system may also receive from a second computing device associated with the second user account, an item of content having the characteristic. The social networking system may send, to the first computing device associated with the first user account and based on the request to restrict presentation, a first instruction to present a first representation of the item of content. The social networking system may also send, to the second computing device associated with the second user account, a second instruction to present a second representation of the item of content, the second representation of the item of content being different than the first representation of the item of content.

In some examples, the characteristic of the item of content is being associated with or addressed to the first user account.

In some examples, the first representation of the item of content includes an indication of existence of the item of content and a control usable to cause presentation of the item of content by the first computing device.

In some examples, the second representation of the item of content appears as though visible to other user accounts.

In some examples, the item of content is a comment by the second user account associated with another item of content published by the first user account.

In some examples, an instruction to present a selectable control usable to approve or disapprove the comment is sent to the first computing device.

In some examples, an indication of selection of the selectable control to disapprove the comment is received; and based on receiving the indication to disapprove the comment, an instruction to cease presenting the first representation of the item of content is sent, or the second representation of the item of content is refrained from being sent to a third computing device associated with a third user account.

In some examples, an indication of a selection of the selectable control to approve the comment is received; and based on receiving the indication to approve the comment, an instruction to present the second representation of the item of content is sent to the first computing device, or an instruction to present the second representation of the item of content is sent to a third computing device associated with the third user account.

In some examples, the item of content is a message from the second user account to the first user account.

In some examples, the first instruction to present the first representation of the item of content is an instruction to present an indication of existence of the message in a secondary inbox.

In some examples, a request to view the message is received; and an instruction to present the message and a control usable to unrestrict presentation of content received from the second user, or delete the message are sent to the first computing device.

In some examples, a notification that the message has been presented at the first computing device is refrained from being sent to the second computing device.

In some examples, input comprising a portion of an identifier of the first user account is received. The portion of the identifier of the first user account may be determined to be less than a threshold level of similarity to the identifier of the first user account, and one or more candidate user accounts may be output based on whether the portion of the identifier of the first user account is less than the threshold level of similarity, in which case the one or more candidate accounts omits the first user account.

In some examples, input that includes a portion of an identifier of the first user account may be received from the second computing device. The portion of the identifier of the first user account may be determined to meet or exceed a threshold level of similarity to the identifier of the first user account, and one or more candidate user accounts, including the first user account, may be output based on whether the portion of the identifier of the first user account meets or exceeds the threshold level of similarity.

In some examples, the threshold level of similarity is based on the request to restrict presentation of content having the characteristic.

In addition to the societal improvements discussed above, the techniques described herein also improve performance of one or more computing devices by reducing an amount of content sent over a network. For instance, once a user disapproves content, the content may be deleted from the user's computing device and may be restricted from being disseminated to other user's computing devices. In this way, the quantity of data sent over the network may be reduced.

Additionally, in some examples, the described techniques improve a user interface of a computing device by displaying a limited set of information to a user. For instance, the information displayed to a victim of bullying may improve efficiency of using an electronic device by allowing the victim to more quickly access options to control how data input by the bully is displayed to the victim, the bully, and third parties. Further, the speed of presenting these controls to the victim is improved by selectively outputting controls to the victim when the bully submits content associated with the victim. In this way, the user may decide in real time whether to restrict activity by the bully associated with the victim's account much faster than existing techniques (e.g., "blocking" the bully), which may require the victim to navigate a series of settings and/or menu screens to control the bully's behavior that may be entirely unassociated with the content posted by the bully.

These and other aspects are described further below with reference to the accompanying drawings. The drawings are merely example implementations, and should not be construed to limit the scope of the claims. For example, while examples are illustrated in the context of a user interface for a mobile device, the techniques may be implemented using any computing device and the user interface may be adapted to the size, shape, and configuration of the particular computing device. Also, while many of the examples are given in the context of bullying, the techniques described herein may also be applied to, without limitation, aggressive content, threatening content, sexual content, abusive content, or any other content that is objectionable to a user.

In particular examples, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example, and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example, and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular examples, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access, including the "restrict" functionality described herein. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external web sites), other suitable entities, or any suitable combination thereof. Although this disclosure describes particular granularities of permitted access or denial of access, this disclosure contemplates any suitable granularities of permitted access or denial of access.

In particular examples, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example, and not by way of limitation, one or more objects may be visible to a user's "Trending" page. In particular examples, an object may correspond to a particular user. The object may be content associated with the particular user, or may be the particular user's account or information stored on the social-networking system, or other computing system. As an example, and not by way of limitation, a first user may view one or more second users of an online social network through a "People You May Know" function of the online social network, or by viewing a list of friends of the first user. As an example, and not by way of limitation, a first user may specify that they do not wish to see objects associated with a particular second user in their newsfeed or friends list.

If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may have different types of privacy settings. As an example, and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example, and not by way of limitation, a first user may specify that other users who attend the same university as the first user may view the first user's pictures, but that other users who are family members of the first user may not view those same pictures.

In particular examples, the social-networking system may provide one or more default privacy settings for each object of a particular object-type. A privacy setting for an object that is set to a default may be changed by a user associated with that object. As an example, and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the social-networking system may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example, and not by way of limitation, a first user may transmit a message to a second user via an application related to the online social network (e.g., a messaging app), and may specify privacy settings that such messages should not be stored by the social-networking system.

In particular examples, a user may specify whether particular types of objects or information associated with the first user may be accessed, stored, or used by the social-networking system. As an example, and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular examples, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example, and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

Privacy Settings for Mood, Emotion, or Sentiment Information

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The social-networking system may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the social-networking system may use a user's previous activities and calculated moods, emotions, or sentiments to determine a present mood, emotion, or sentiment. A user who wishes to enable this functionality may indicate in their privacy settings that they opt in to the social-networking system receiving the inputs necessary to determine the mood, emotion, or sentiment. As an example, and not by way of limitation, the social-networking system may determine that a default privacy setting is to not receive any information necessary for determining mood, emotion, or sentiment until there is an express indication from a user that the social-networking system may do so. By contrast, if a user does not opt in to the social-networking system receiving these inputs (or affirmatively opts out of the social-networking system receiving these inputs), the social-networking system may be prevented from receiving, collecting, logging, or storing these inputs or any information associated with these inputs. In particular examples, the social-networking system may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example, and not by way of limitation, the social-networking system may use the user's mood, emotion, or sentiment to provide newsfeed items, pages, friends, or advertisements to a user. The user may specify in their privacy settings that the social-networking system may determine the user's mood, emotion, or sentiment. The user may then be asked to provide additional privacy settings to indicate the purposes for which the user's mood, emotion, or sentiment may be used. The user may indicate that the social-networking system may use his or her mood, emotion, or sentiment to provide newsfeed content and recommend pages, but not for recommending friends or advertisements. The social-networking system may then only provide newsfeed content or pages based on user mood, emotion, or sentiment, and may not use that information for any other purpose, even if not expressly prohibited by the privacy settings.

Privacy Settings for Ephemeral Sharing

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example, and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the social-networking system may be restricted in its access, storage, or use of the objects or information. The social-networking system may temporarily access, store, or use these particular objects or information in order to facilitate particular actions of a user associated with the objects or information, and may subsequently delete the objects or information, as specified by the respective privacy settings. As an example, and not by way of limitation, a first user may transmit a message to a second user, and the social-networking system may temporarily store the message in a data store until the second user has viewed or downloaded the message, at which point the social-networking system may delete the message from the data store. As another example and not by way of limitation, continuing with the prior example, the message may be stored for a specified period of time (e.g., 2 weeks), after which point the social-networking system may delete the message from the data store.

Privacy Settings for User-Authentication and Experience-Personalization Information In particular examples, the social-networking system may have functionalities that may use, as inputs, personal or biometric information of a user for user-authentication or experience-personalization purposes. A user may opt to make use of these functionalities to enhance their experience on the online social network. As an example, and not by way of limitation, a user may provide personal or biometric information to the social-networking system. The user's privacy settings may specify that such information may be used only for particular processes, such as authentication, and further specify that such information may not be shared with any third-party system or used for other processes or applications associated with the social-networking system. As another example and not by way of limitation, the social-networking system may provide a functionality for a user to provide voice-print recordings to the online social network. As an example, and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the social-networking system. As another example and not by way of limitation, the social-networking system may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the social-networking system.

User-Initiated Changes to Privacy Settings

In particular examples, changes to privacy settings may take effect retroactively, affecting the visibility of objects and content shared prior to the change. As an example, and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the social-networking system may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social-networking system may determine that a first user may want to change one or more privacy settings in response to a trigger action associated with the first user. The trigger action may be any suitable action on the online social network. As an example, and not by way of limitation, a trigger action may be a change in the relationship between a first and second user of the online social network (e.g., "un-friending" a user, changing the relationship status between the users). In particular examples, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example, and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example, and not by way of limitation, the social-networking system may send a reminder to the user to confirm his or her privacy settings every six months or after every ten photo posts. In particular examples, privacy settings may also allow users to control access to the objects or information on a per-request basis. As an example, and not by way of limitation, the social-networking system may notify the user whenever a third-party system attempts to access information associated with the user, and require the user to provide verification that access should be allowed before proceeding.

Example System Architecture

FIG. 1 is a schematic view of an example system 100 usable to implement the techniques described herein to allow users to control the extent to which others can disseminate negative, harmful, false, mean, or otherwise objectionable content to or about them via the system 100. In some examples, the techniques described herein may allow a victim to designate a bully as being "restricted" to mitigate the ability of the bully to disseminate objectionable content about the victim. As illustrated in FIG. 1, the system 100 may allow users 102(1), 102(2), . . . 102(n) (collectively "users 102") to interact using computing devices 104(1), 104(2), . . . 104(m) (collectively "computing devices 104") with a social networking system 106 via a network 108. The variables n and m in this example are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over network 108.

Network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which computing devices 104 may access the social networking system 106 and/or communicate with one another.

Social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to help foster the safety and security of the users 102. For instance, the social networking system 106 may empower users to control the extent to which a bully can disseminate negative, harmful, false, mean, or otherwise objectionable content to or about them via the social networking system 106.

FIG. 1 illustrates an example in which, at operation 110, a second user 102(2) disseminates mean or otherwise objectionable content (e.g., a post, a message, comments, tags, mentions) to a first user 102(1) or about the first user (102(1). For example, the objectionable content may be a mean comment by the second user 102(2) about a picture or other content item posted on a newsfeed or story of the first user 102(1). As another example, the objectionable content may be a mean message sent from the second user 102(2) to the first user 102(1).

Upon becoming aware of the objectionable content (e.g., by seeing the comment on his or her newsfeed or story, or by receiving the message), the first user 102(1) may, at operation 112, send a request to the social networking system 106 to restrict presentation of content received from the account of the second user 102(2) if it is associated with the first user 102(1)(e.g., if it has the characteristic of being directed to an account of the first user or being about the first user). In response, the social networking system 106 may designate the account of the second user 102(2) as being restricted with respect to the account of the first user 102(1).

Subsequently, when the social networking system 106 receives an item of content from the account of the second user 102(2) that is associated with the first user 102(1), the social networking system 106 may, at operation 114, hold the item of content in a pending state to allow the first user 102(1) to review the item of content prior to publishing or otherwise making the item of content visible to other users (e.g., contacts, connections, friends, followers, etc.) of the social networking service 106.

While the item of content is in the pending state, the first computing device 104(1) associated with the account of the first user 102(1) may receive an instruction to present a first representation of the item of content. For instance, the first representation of the item of content to be presented by the first computing device 104(1) associated with the account of the first user 102(1) may include an indication of existence of the item of content (but not the substance of the item of content) and a control usable to cause presentation of the item of content by the second computing device. In this way, the first user 102(1) may choose whether or not to view the item of content from the second user 102(2), thereby insulating them from further abuse or torment from the bully. If the first user 102(1) selects the control to cause presentation of the item of content, the social networking system 106 may send an instruction to the first client device 104(1) to present a selectable control usable to approve or disapprove (e.g., delete) the item of content. Meanwhile, the second computing device 104(2) associated with the account of the second user 102(2)(the bully in this example) may receive an instruction to present a second representation of the item of content, which is different than the first representation of the item of content. The second representation of the item of content may appear as though the item of content is live (e.g., has been published or made visible to the first user and/or other users), despite the fact that item of content is in a pending state and has not yet been approved by the victim for publication to other users. In some examples, the social networking service 106 may refrain from sending the second representation of the item of content to a third computing device 104 associated with a third user account (e.g., the device of a third-party).

In this way, the first user 102(1) (the victim in this example) is able to limit the ability of the second user 102(2) (the bully in this example) to disseminate objectionable content to or about the first user 102(1). The techniques described herein may allow victims to monitor content sent, posted, or shared by bullies or other restricted parties, and may allow the victims to decide whether or not to approve the content. In some examples, the techniques described herein may be implemented without notifying the bully that he or she has been restricted (e.g., the fact that victim has restricted the bully is not visible via the user account of the bully), thereby avoiding inciting the bully.

Example User Interfaces

FIG. 2A-FIG. 7C are schematic views showing example user interfaces that are usable to implement the techniques described herein for enabling a first user to restrict presentation of content received from a second user. The interfaces may be generated by a computing device of a social networking system (e.g., social networking system 106) and transmitted to one or more user computing devices (e.g., computing devices 104) for presentation and/or the interfaces may be generated by the one or more user computing devices based at least in part on instructions received from the social networking system. As discussed above, the interfaces described in this section may, but need not, be implemented in the context of the system 100.

Figure 2C:
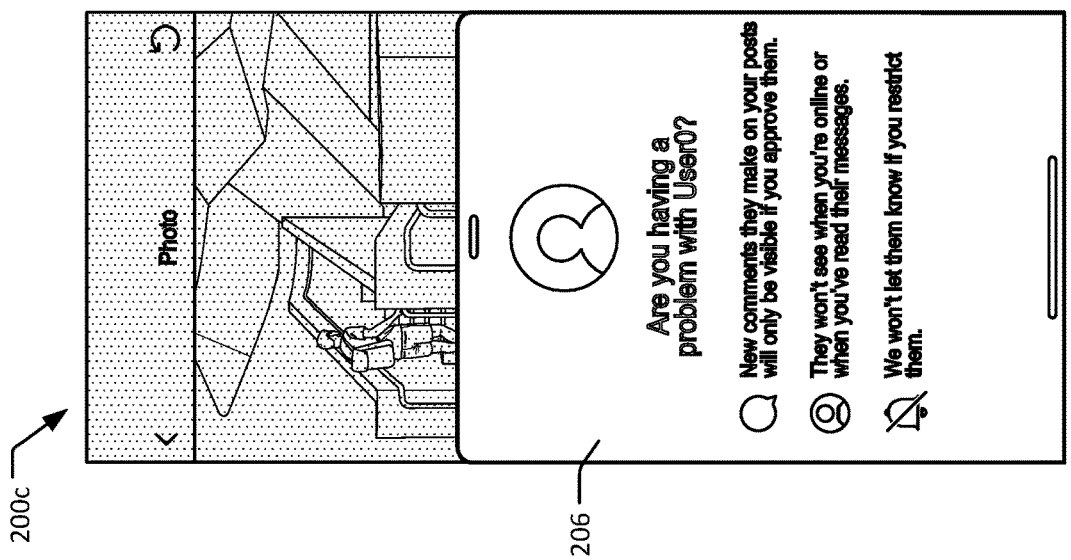
FIGS. 2A-2C illustrate example interfaces usable to enable a first user to request that an account of another user that has posted an objectionable comment on a post of the user be restricted.
Figure 2B:
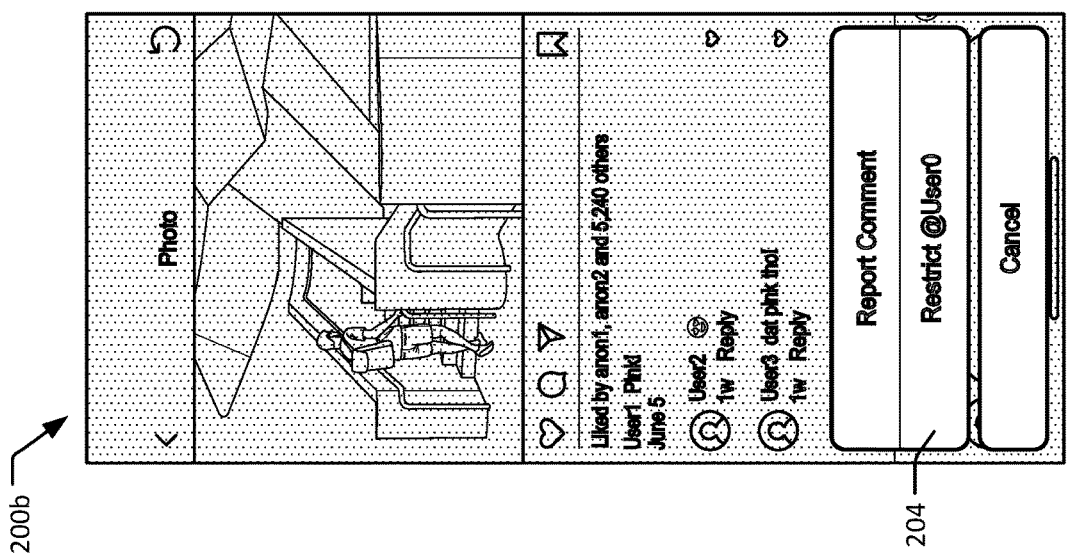
Figure 2A:
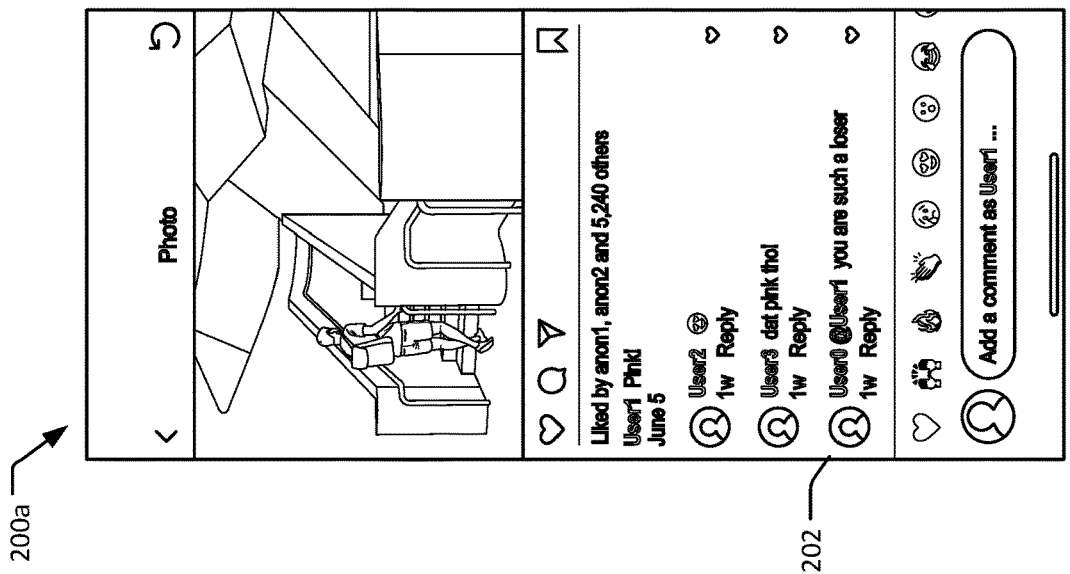

FIGS. 2A-2C illustrate an example in which objectionable content in the form of a comment is posted by a second user ("User0" in this example) in response to a post of a photo posted in a feed of a first user ("User1" in this example). A first interface 200a shown in FIG. 2A corresponds to a post in the first user's feed or story as it would appear on a computing device associated with an account of the first user. In this example, the second user (User0) has posted a mean comment 202 ("@User1 you are such a loser') in response to User1's post. The comment 202 is associated with User1 in that it references User1 directly, and in that it is in response to a post made by User1. In this example, User1 has selected the comment 202, which results in display of a second interface 200b of FIG. 2B on the client device of User1. As used herein, unless otherwise indicated, the term "select" or "selection" means a touch, a force touch, a multi-touch, a swipe in any direction, a voice input, a mouse input, a stylus input, or any other input designed to interact with a user interface control. The second interface 200b includes a selectable control 204 usable to send a request to the social networking system to restrict User0. Selection of control 204 sends a request from User1's computing device to the social networking system to restrict presentation of content received from User0's user account which has a characteristic (e.g., being directed, about, or otherwise associated with the account of User1). In some examples, a third interface 200c shown in FIG. 2C includes a notification 206 which may be displayed to User1 describing the functionality or result of restricting User0. In some examples, the notification 206 may be presented a first time a user views or selects the control 204, every time the user views or selects the control 204, in upon request of the user (e.g., selection of a "help" or "learn more" control which is not shown in this example), or the notification 206 may be omitted entirely. In the illustrated example, notification 206 describes that restricting User0 will result in "New comments they make to your posts will only be visible if you approve them," "they won't see when you're online or when you've read their messages," and "we won't let them know if you restrict them." However, in other examples, the notification 206 may contain additional or alternative information.

Figure 3B:
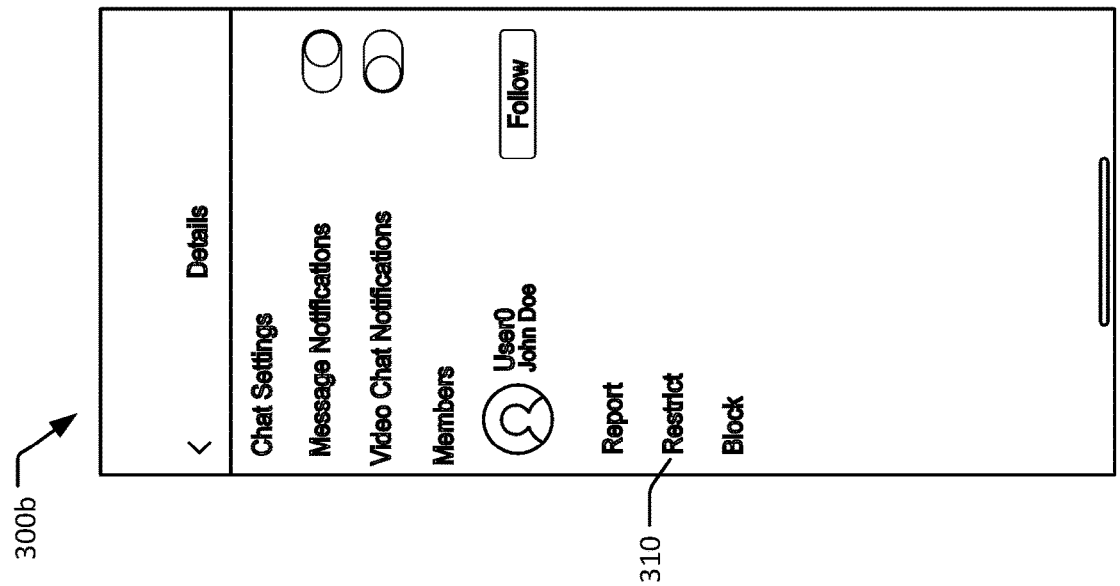
FIGS. 3A and 3B illustrate example interfaces usable to enable a first user to request that an account of another user that has sent an objectionable message to the user be restricted.
Figure 3A:
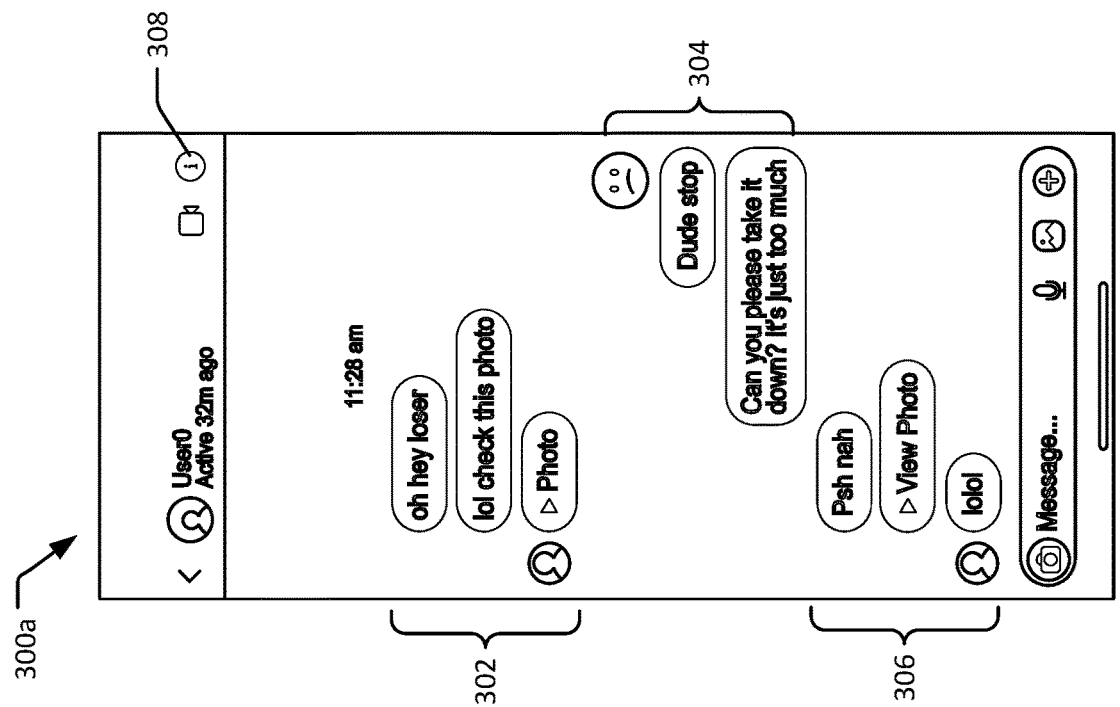

FIGS. 3A and 3B illustrate an example in which objectionable content in the form of a message is sent by the second user ("User0" in this example) to the first user ("User1" in this example). In this case, a first interface 300a corresponds to a user interface displayed on a client device associated with an account of User1. The interface 300a in this example is a message thread which includes a series of objectionable messages 302 received from User0. In response to receipt of the messages 302, User1 sent a series of reply messages 304 asking User0 to "please take it down," to which User0 sent an unkind series of reply messages 306. Continuing with the example, User1 then selects an interface control 308 (an "information" icon in this example), which causes presentation of a second interface 300b which includes details and settings related to User0. Among other things, the second interface 300b includes a selectable control 310 usable to send a request to the social networking system to restrict User0. Selection of selectable control 310 sends a request from User0's computing device to the social networking system to restrict presentation of content received from User0's user account which has a characteristic (e.g., being directed, about, or otherwise associated with the account of User1).

FIGS. 4A-4F illustrate a continuation of the example of FIGS. 2A-2C, and show a scenario in which the second user ("User0" in this example) has already been restricted and submits a content item associated with the first user ("User1" in this example). An interface 400a in this example is substantially the same as the interface 200a in FIG. 2A, and depicts an interface that would appear when viewed on a computing device associated with an account of the second user (User0, bully in this example). As shown, User0 has submitted a mean comment as shown by representation 402 of the comment, which appears on the interface 400a as if it has been published (e.g., is live and visible to the second user and/or other users). In response to User0 submitting comment 402, the social networking system sends an instruction to a computing device associated with the account of the first user (User1) to present an interface 400b including a notification 404, informing the User1 that User0 has commented on User1's post. Responsive to User1 selecting the notification 404, an interface 400c is displayed which includes User1's post and any comments that have been posted in response to the post. In this example, a representation of the comment from User0 appears as representation 406. As shown, representation 406 of the comment presented on the computing device of User1 is different than the representation 402 of the comment on the computing device of User0. In some examples, the representation 406 presented on the computing device of User1 may indicate the existence of the comment from the restricted account while hiding, obscuring, or otherwise refraining from displaying content of the comment. For instance, as shown, the representation 406 presented on the computing device of User1 includes an indication of the existence of a comment from the restricted account (the account of User0), and includes a selectable control 408 ("tap to read" in this example), which is usable to request presentation of the content of the comment. However, other techniques are contemplated for displaying the existence of the comment without displaying the content of the comment including presenting the representation 406 on the computing device of User1 with portions of the comment greyed out, obscured, or otherwise hidden. In this way, the representation 406 presented on the computing device of User1 serves as a "sensitivity screen" allowing User 1 to choose if and when to view the content of the comment. Thus, interface 400c allows User1 to see when the restricted user (User0) comments without being subjected to potentially objectionable content from the restricted user.

FIG. 4D depicts an interface 400d presented in response to selection by User1 of the selectable control 408. As shown, interface 400d displays the content of the comment ("you are a loser" in this example) along with an approval control 410 usable to approve or disapprove ("delete") the comment. Interface 400e of FIG. 4E corresponds to an interface that is displayed if User1 selects to approve the comment using the approval control 410, while interface 400f of FIG. 4F corresponds to an interface that can be displayed in response to the user disapproving/deleting the comment using the approval control 410.

Figure 5F:
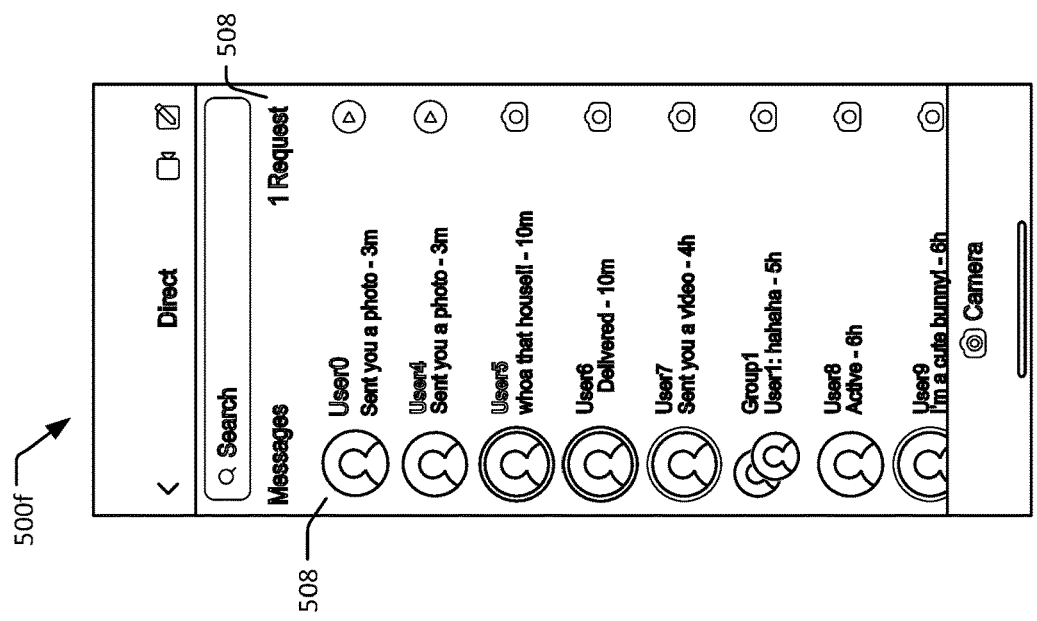
Figure 5E:
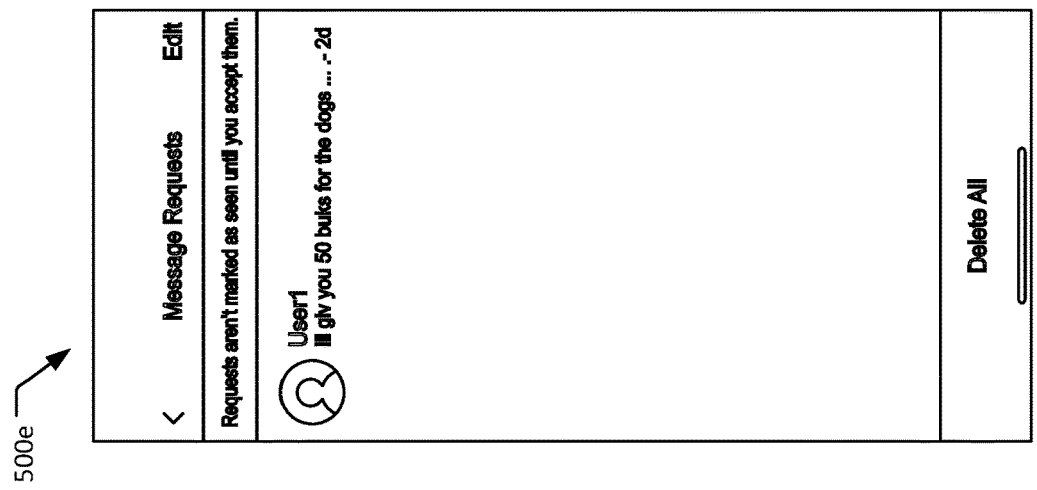
Figure 5D:
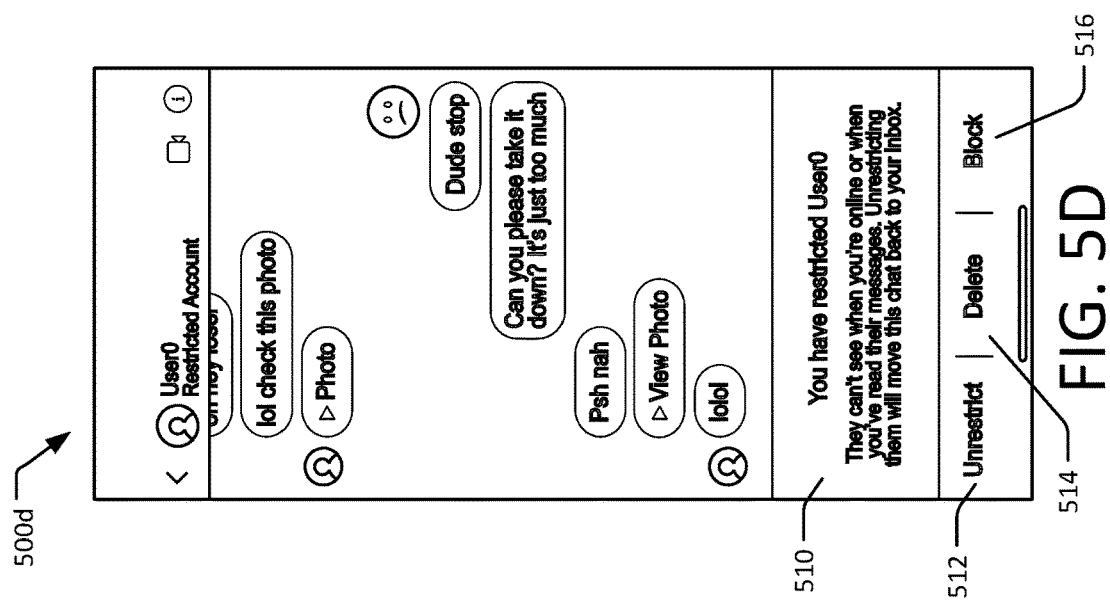

FIGS. 5A-5B illustrate a continuation of the example of FIGS. 3A and 3B, and show a scenario in which the second user ("User0" in this example) has already been restricted and sends a message to the first user ("User1" in this example). An interface 500a in this example is substantially the same as the interface 300a in FIG. 3A, and depicts an interface that would appear when viewed on a computing device associated with an account of the second user (User0, bully in this example). As shown, User0 has sent a mean series of messages as shown by representation 502, which appears on the interface 500a as if it has been published (e.g., received and visible to the second user). FIG. 5B illustrates an interface 500b including a primary inbox 504 that may be caused to be presented on a computing device associated with the account of User1. As shown, the series of messages from the restricted user (User0) are not presented in the primary inbox 504. Instead, messages from the restricted user (User0) are added to a message requests queue accessible by selection of a message request control 506. In some examples, messages from the restricted user (User0) may include further comments on a post of User1. Additionally, or alternatively, messages from the restricted user (User0) may include a message sent directly to the account of User 1 via a social networking system. Selection of the message request control 506 causes presentation of the interface 500c shown in FIG. 5C. The interface 500c includes a queue of message requests including messages received from restricted users, such as the message 508 received from User0. Messages from restricted users are designated as being "restricted accounts" but do not display the content of the message in this example. If User1 desires to read the message 508, User1 may do so by selecting the message 508, which causes interface 500d of FIG. 5D to be presented. Interface 500d includes a notification 510 explaining to the user that the message is from a restricted user (User0) and that the restricted user "can't see when you're online or when you've read their messages" and that "unrestricting them will move this chat back to your inbox." Additionally, interface 500d includes an unrestrict control 512 usable to request to unrestrict the user, a delete control 514 usable to delete the message, and a block control 516 usable to block future messages from User0. Interface 500e of FIG. 5E corresponds to an interface that is displayed if User1 selects to unrestrict User0 using the unrestrict control 512, while interface 500f of FIG. 5F corresponds to an interface that can be displayed in response to the user deleting the message using the delete control 514. Also, in some examples, comments made by a user while the account of the user is restricted will remain in the pending state until manually approved or disapproved by the restricting user (User1 in this example).

Figure 6A:
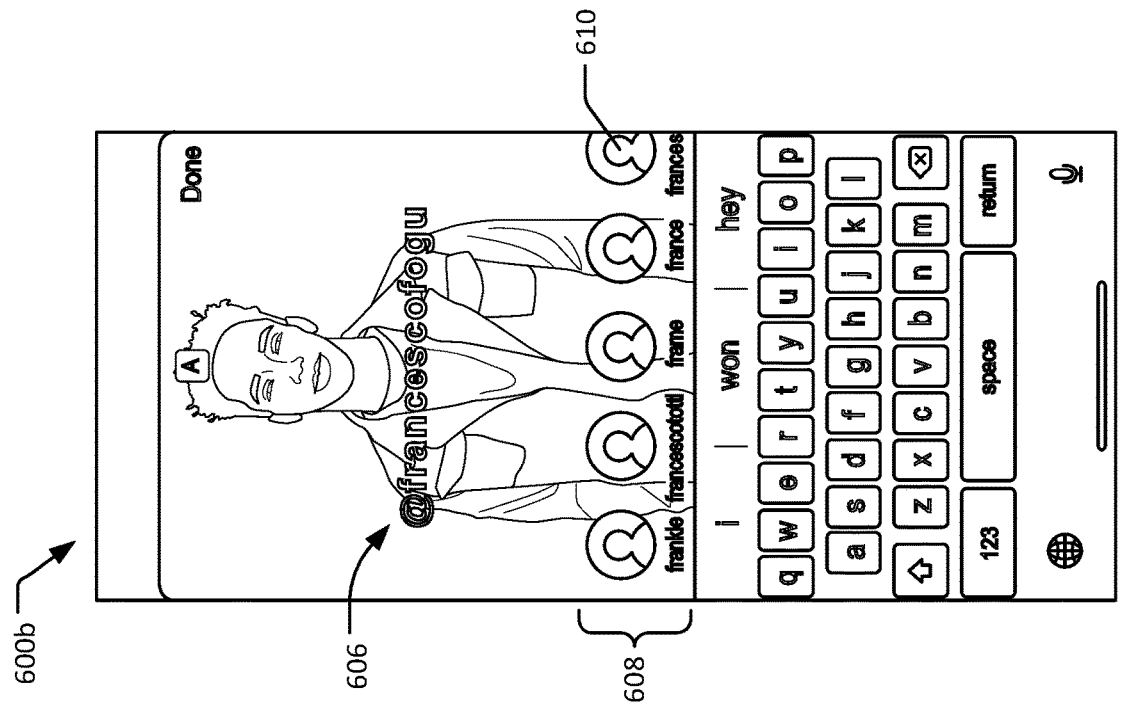
FIGS. 6A and 6B illustrate example interfaces showing application of friction to make it more difficult for restricted users to tag or mention restricting users.
Figure 6B:
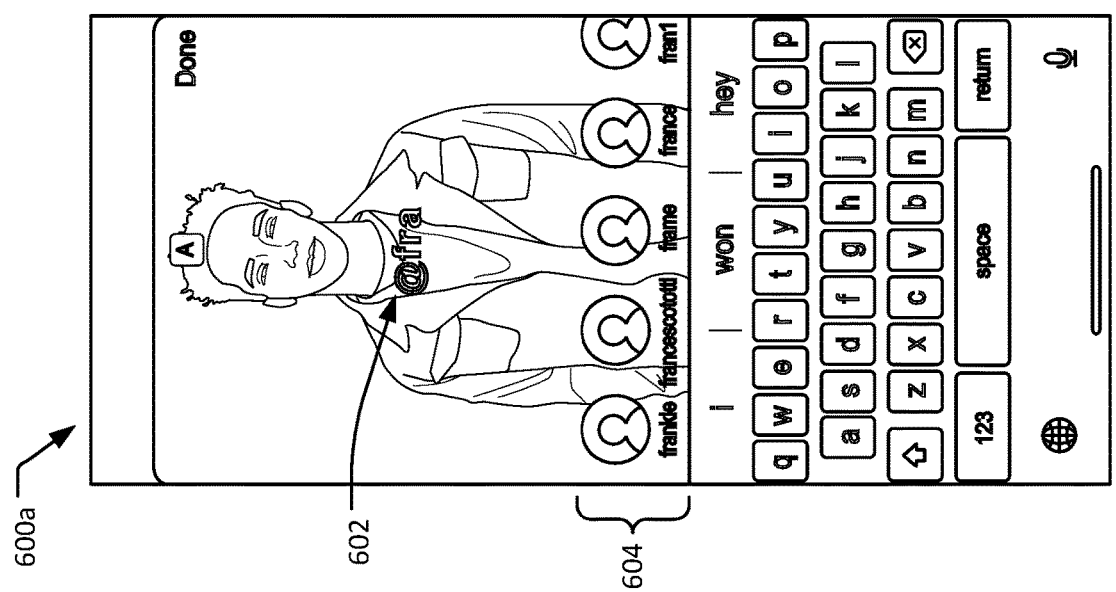

FIGS. 6A and 6B illustrate example interfaces 600a and 600b illustrating a scenario in which a restricted user (User0 in this example) attempts to tag or mention a user that restricted them (Francesco in this example). Typically, when a user begins entering one or more characters to search for another user account (e.g., a user name, email, handle, etc.) in a search field, a social networking system will output candidate user accounts. The candidate user accounts output may be based on how closely the candidate user accounts match the entered characters, how frequently the candidate user accounts are tagged/mentioned by the user or other users, and/or other criteria. However, as shown in FIGS. 6A and 6B, when a restricted user enters characters to search for another user that has restricted the restricted user, the social networking system will apply friction to make it more difficult for the restricted user to tag or mention the user that restricted them. This friction may take the form of applying a higher threshold level of similarity (e.g., 90% similar, 95% similar, 100% similar or matching) between the entered text and the user account of the restricting user (i.e., the user that restricted the user that is attempting to tag or mention them) and/or down weighting user accounts of restricting users in the candidate results. For instance, interface 600*a* illustrates an example in which User0 is entering text 602 ("@fra") to attempt to tag or mention a user Francesco that has previously restricted User0. The interface 600*a* outputs a group of candidate user accounts 604. However, in this example the restricting user (Francesco) is omitted from the group of candidate user accounts 604 since the input text string "@fra" is not sufficiently similar (e.g., is less than the similarity threshold) to the restricting user account ("@francescofogu").

FIG. 6B illustrates an example interface 600*b* in which User0 is entering text 606 ("@francescofogu") to attempt to tag or mention the user Francesco that has previously restricted User0. The interface 600*b* in this example outputs a group of candidate user accounts 608. In this example the restricting user (Francesco) is included in the group of candidate user accounts 608 since the input text string "@fracescofogu" is sufficiently similar (e.g., meets or exceeds the similarity threshold) to the restricting user account ("@francescofogu"). However, in this example, even though the input search string 606 matches the user account exactly, the system down weights Francesco's account since he is a restricting user so that the user account for Francesco appears last in the group of candidate user accounts 608. Thus, in this way, the social networking system applies friction to make it more difficult for restricted users to tag or mention the users that have restricted them (the restricting users).

FIGS. 7A-7C illustrate additional interfaces 700*a*, 700*b*, and 700*c* that can be presented to users to allow them to set and/or manage restricted accounts. FIG. 7A illustrates an example interface 700*a* that can be presented to a user including a notification 702 introducing the functionality of the restrict feature of the social networking system. The interface 700*a* may be presented in response to an update of an application running on the user's computing device, in response to a request to block a user, in response to detection of potentially mean or harmful content in a comment or message, in response to the user accessing settings of the social networking application, or the like. Selection of a selectable control 704 causes presentation of interface 700*b* shown in FIG. 7B, which includes a toggle switch that allows the user to switch between a list of accounts 706 and a list of restricted accounts 708. In FIG. 7B the switch is toggled to show the list of accounts 706 may be ordered in any order. In some examples, the list of accounts 706 may be ordered alphabetically, based on length of connection between the user and the account, based on number of times the account has been restricted, number of times comments by the account have been flagged by the user or other users as containing objectionable content, behavioral signs (e.g., subject matter of historical or recent posts, comments, tags, etc.), number of times a user has been reported by other users, and/or any other criteria. Interface 700*b* also includes a selectable restrict control 710, corresponding to each account in the list of account 706, usable to request that the respective user account be designated as restricted with respect to content associated with the restricting user.

Once a user account has been designated as being restricted based on selection of the selectable restrict control 710, the user account is moved to the list of restricted accounts 708, which is shown on the interface 700*c* of FIG. 7C. The list of restricted accounts 708 includes, a selectable unrestrict control 712, corresponding to each account in the list of restricted accounts 708, usable to request that the respective user account be designated as unrestricted (e.g., remove the user account from the restricted list) with respect to content associated with the restricting user. In some examples, comments made by a user while the account of the user is restricted will remain in the pending state (e.g., will remain hidden after the restricted user is unrestricted) until manually approved or disapproved by the restricting user. Also, in some examples, when a user account is unrestricted, message threads with the user account will be moved from the pending (Message Request) inbox (shown in interface 500*c* in FIG. 5*c*) to the primary inbox (e.g., interface 504 shown in FIG. 5B).

Example Computing Architecture

Figure 8:
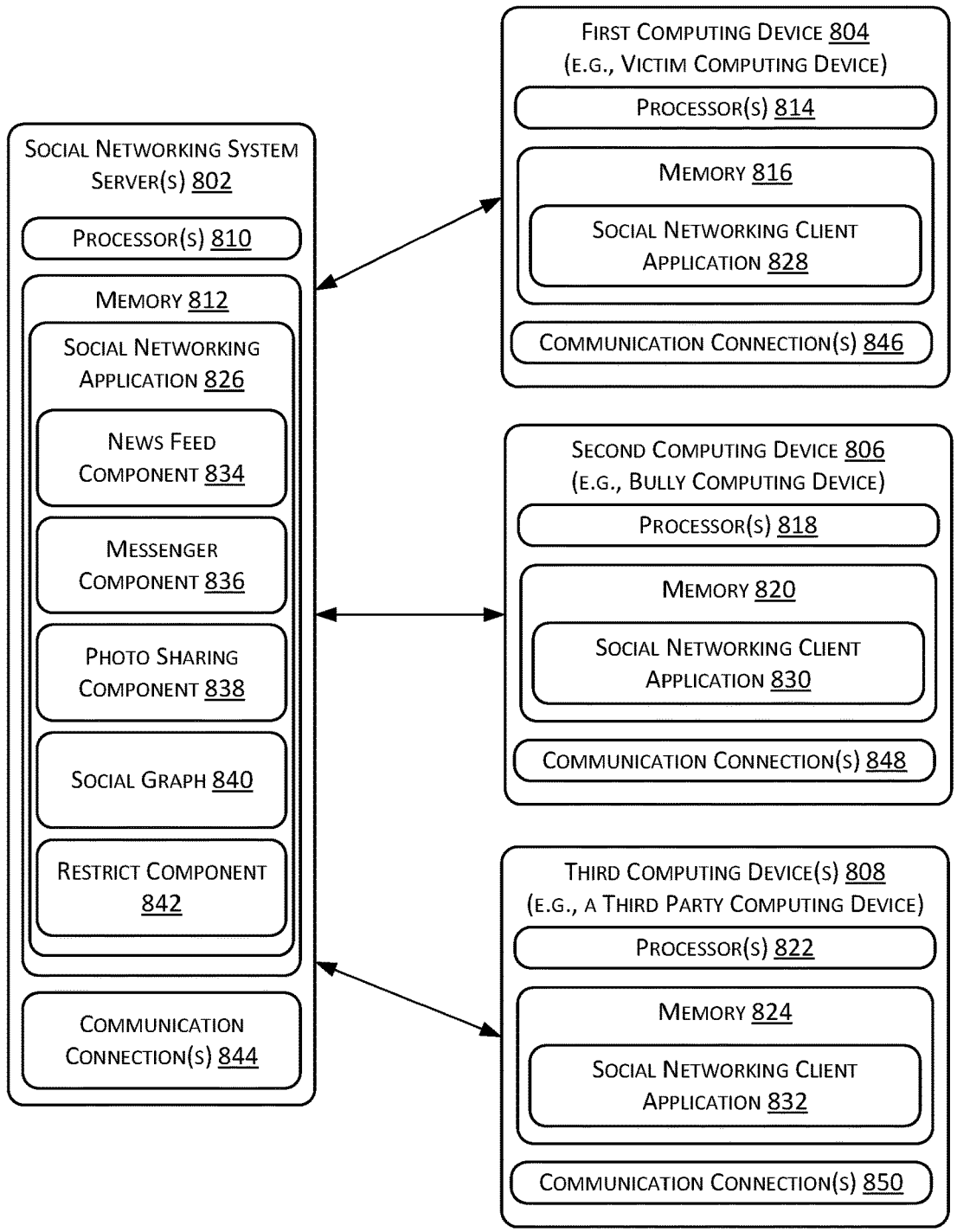
FIG. 8 illustrates a block diagram illustrating an example system of computing devices usable to implement example techniques described herein.

FIG. 8 illustrates a block diagram illustrating an example system 800 of computing devices usable to implement example techniques described herein. For example, FIG. 8 illustrates example computing devices including social networking system server(s) 802, a first computing device 804, a second computing device 806, and one or more additional computing devices 808 that interact over a network, such as network 108 in FIG. 1. By way of example and not limitation, the social networking system server(s) 802 may be representative of servers used to implement the social networking system 106, the first computing device 804 may be representative of the first computing device 104(1) associated with the first user 102(1)(the victim in the example of FIG. 1), the second computing device 806 may be representative of the second computing device 104(2) associated with the second user 102(2)(the bully in the example of FIG. 1), and the one or more additional computing devices 808 may be representative of the computing device 104(*m*) associated with the third user 102(*n*)(a third party in the example of FIG. 1).

The social networking system server(s) 802 may comprise one or more individual servers or other computing devices that may be physically located in a single central location, or may be distributed at multiple different locations. The social networking system server(s) 802 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

Each of the computing devices described herein may include one or more processors and/or memory. Specifically, in the illustrated example, social networking system server(s) 802 include one or more processors 810 and memory 812, first computing device 804 includes one or more processors 814 and memory 816, second computing device 806 includes one or more processors 818 and memory 820, and additional computing device(s) 808 include one or more processors 822 and memory 824. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

As shown in FIG. 8, social networking system server(s) 802 include a social networking application 826, first computing device 804 includes social networking client application 828, second computing device 806 includes social networking client application 830, and additional computing device(s) 808 include social networking client application 832 that enables interaction of content among the computing devices via the social networking system server 802. For example, content (e.g., text, images, audio, video, etc.) can be shared among users associated with social network accounts of an online social network provided by the social network system and may include sharing content in accordance with an account of a user that is restricted. In some examples, the social networking client application enables interfaces to access content, to view content, and to restrict and/or unrestrict users such as those described with reference to FIGS. 2A-7C for example. In particular examples, social networking system server(s) 802 send instructions to present, transmit, and receive content as discussed with reference to FIG. 2A-FIG. 7C.

FIG. 8 further illustrates social networking system server(s) 802 as including news feed component 834, messenger component 836, and photo sharing component 838 to enable content such as news, messages, and/or photos to be shared among the computing devices. Sharing of content among the computing devices may be made using a social graph 840 included in the social network system server(s) 802 to identify social-graph elements representing relationships between users of the social networking system. In some examples, social-graph elements, such as a node or an edge (not shown), may specify how the social-graph element, information associated with the social-graph element, or objects associated with the social-graph element can be accessed using the online social network. For instance, the social graph 840 may also, with input from a user, create and store a record of relationships of the user with other users of the social networking system to facilitate social interaction between or among the users. In some examples, the social graph 840 may indicate relationships between user accounts, including friends, followers, blocked users, restricted users, and the like.

As shown in FIG. 8, social networking system server(s) 802 also include a restrict component 842 that includes a mapping of restricted users for each user. In this way, the social networking system server(s) 802 can mitigate bullying by providing specific content for each computing device's social networking client application based at least in part on the mapping of restricted users. These and other techniques are discussed herein and are discussed further in relation to FIG. 9 below.

As shown in FIG. 8, social networking system server(s) 802 include communications connection(s) 844, first computing device 804 includes communications connection(s) 846, second computing device 806 includes communications connection(s) 848, and additional computing device(s) 808 includes communications connection(s) 850 that enables communication between the social networking system server(s) and one or more of first computing device 804, second computing device 806, and additional computing device(s) 808.

The communication connection(s) 844, 846, 848, and/or 850 can include physical and/or logical interfaces for connecting social networking system server(s) 802, first computing device 804, second computing device 806, and/or additional computing device(s) 808 to another computing device or a network, such as network(s) 108. For example, the communications connection(s) 844, 846, 848, and/or 850 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

While FIG. 8 is provided as an example system 800 that can be used to implement techniques described herein, the techniques described and claimed are not limited to being performed by the system 800, nor is the system 800 limited to performing the techniques described herein.

Example Methods

Figure 9:
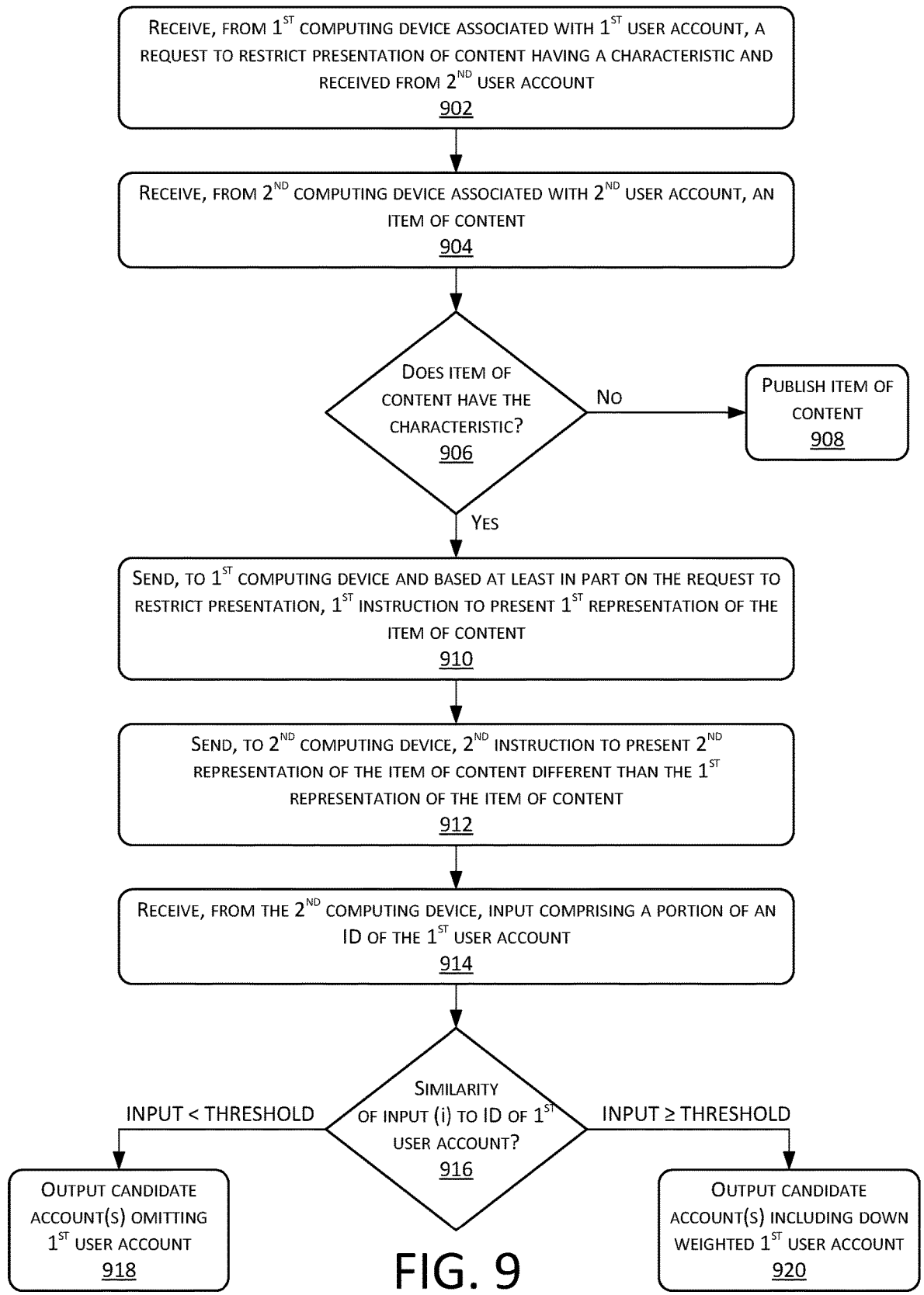
FIG. 9 is a flowchart illustrating example processes usable to implement example techniques described herein.

FIG. 9 illustrates a flowchart illustrating example processes 900 usable to implement example techniques described herein. In some instances, some or all of process 900 can be performed by one or more components in the systems 100 or 800. By way of example and not limitation, the first computing device referred to in process 900 may be representative of the first computing device 104(1) or the first computing device 804 (associated with the victim in the examples of FIGS. 1 and 8), the second computing device referred to in process 900 may be representative of the second computing device 104(2) or the second computing device 806 (associated with the bully in the examples of FIGS. 1 and 8), the social networking system referred to in process 900 may be representative of the social networking system 106 or the social networking system server(s) 802. However, the process 900 is not limited to being performed by the system 100 or 800.

At operation 902, the process 900 can include receiving, from a first computing device (e.g., computing device 804) associated with a first user account a restriction request to restrict presentation of content having a characteristic and received from a second user account. The characteristic may include an item of content being about, addressed to, or otherwise associated with the account of the first user. In this way, the first user is able to control or limit the second user's ability to bully the first user. In some instances, the restriction request may be received in response to the second user previously having previously posted objectionable content (e.g., a comment, message, etc.) associated with the first user. The comment 202 in FIG. 2A and the series of objectionable messages 302 in FIG. 3A are examples of objectionable comment in response to which the first user may send the restriction request. In some examples, a component of the social networking system (e.g., restrict component 824 of social networking system server(s) 802) may process the restriction request and updates a social graph of the user of the second computing device 806 to reflect the selection made at the first computing device 804 to restrict the user of the second computing device 806.

At operation 904, the process 900 can include receiving, from the second computing device associated with the second user account, an item of content.

At operation 906, the social networking system (e.g., social networking system server(s) 802) may determine whether the item of content received from the second computing device 806 has the characteristic (e.g., is about the first user, is directed to an account of the first user, references the first user, etc.). If not, at operation 908, the social networking system server(s) 802 may publish the item of content (e.g., make the item of content visible to the first user and/or one or more third parties). In some examples, publishing the item of content at operation 908 may include sending the item of content, an instruction to present the item of content, and/or an instruction to make the item of content accessible to computing devices associated with the first user account and/or one or more third party user accounts.

If, at operation 906, the social networking system (e.g., social networking system server(s) 802) determines that, "yes," the item of content has the characteristic (e.g., is about the first user, is directed to an account of the first user, references the first user, etc.) the social networking system may process the item of content based at least in part on the previously received restriction request. For instance, the social networking system server(s) 802 may process the item of content from the second computing device 806 in accordance with a mapping (e.g., social graph 840) that identifies the restriction of the account of the second user (bully) relative to the account of the first user (victim). In some examples when it is determined that the item of content from the second computing device 806 includes the characteristic (e.g., shown as "Yes" in FIG. 9), the social networking system server(s) 802 generates different representations of the item of content for presentation at the first computing device 804, the second computing device 806, and/or a third computing device 808. The particular representations may be based at least in part on the mapping (e.g., social graph 840) that represents relationships among accounts of users, including certain users being restricted by other users (e.g., the second user being restricted by the first user).

At operation 910, the process 900 can include sending, to the first computing device associated with the first user account and based at least in part on the request to restrict presentation, a first instruction to present a first representation of the item of content. In some examples, based at least in part on the request to restrict presentation, the social networking system server 802 transmits instructions to the first computing device 804 to cause a first representation of the item of content received from the second computing device 806. In some examples, the first representation of the content may include an interface usable to manage the item of content having the characteristic. For instance, the first representation of the item of content can include an indication of existence of the item of content (e.g., representation 406 in FIG. 4C or message 508 in FIG. 5C), a control usable to cause presentation of the item of content by the first computing device (e.g., control 408 in FIG. 4C or selection of message 508 in FIG. 5C), and/or a control usable to approve, unrestrict, and/or delete the content (e.g., control 410 in FIG. 4D, or control 512 and control 514 in FIG. 5D).

Figure 4C:
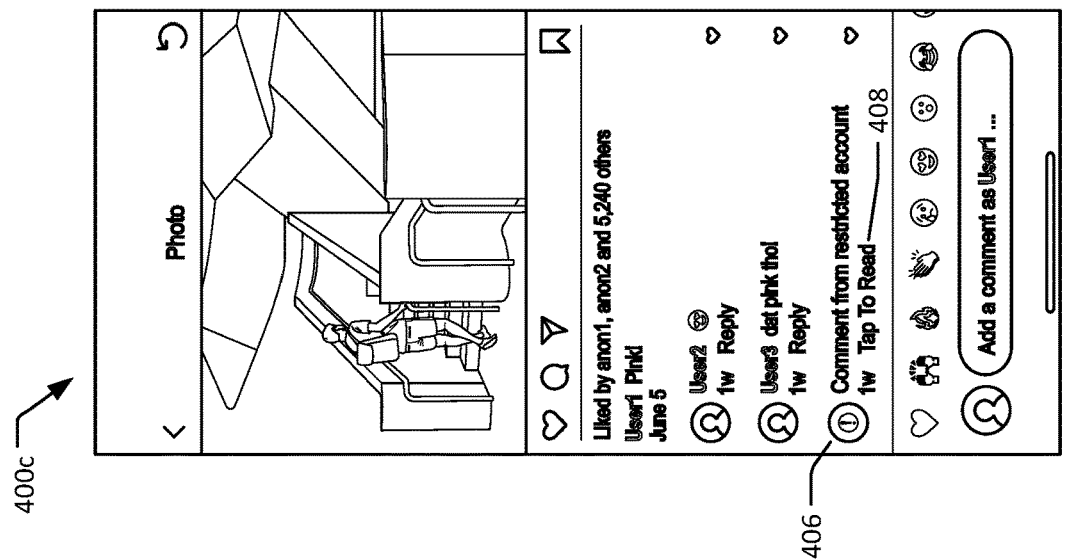
Figure 4B:
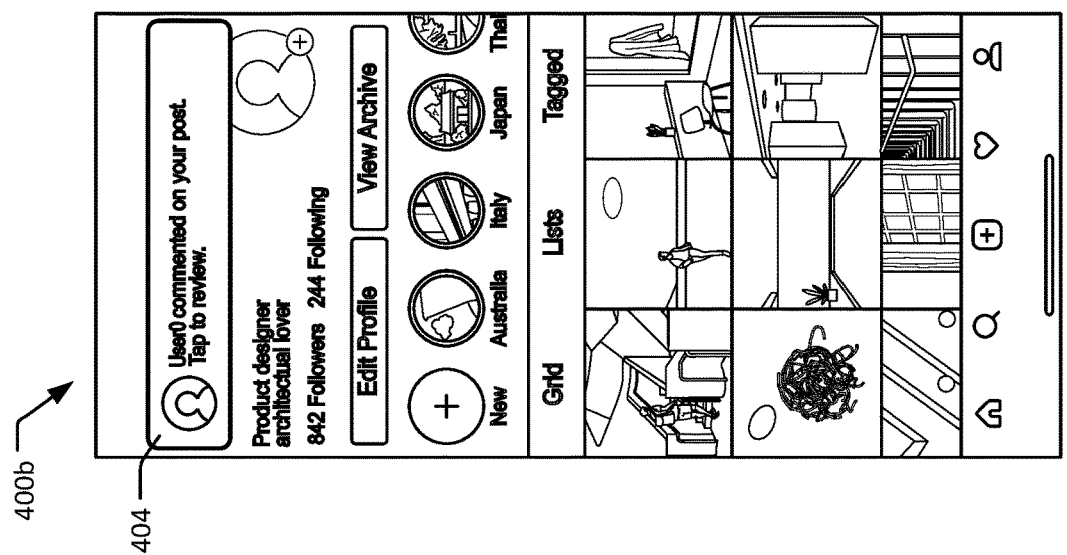
Figure 4A:
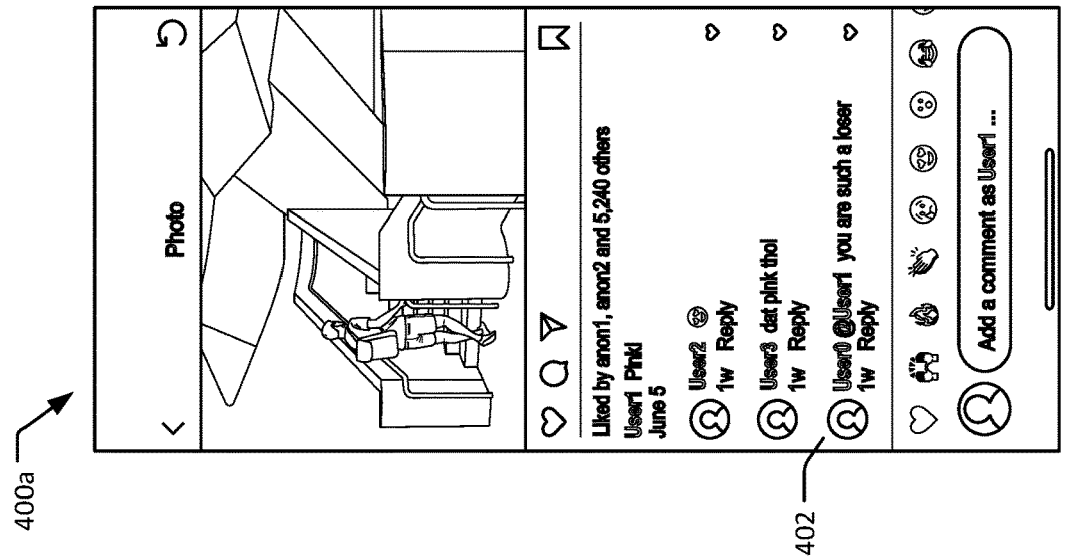

At operation 912, the process 900 can include sending, to the second computing device associated with the second user account, a second instruction to present a second representation of the item of content, the second representation of the item of content being different than the first representation of the item of content. In some examples, the second representation of the item of content makes the item of content appear as if it is presented live (e.g., as though visible to one or more other user accounts). For instance, the interfaces shown in FIGS. 4A and 5A illustrate examples of the second representation of the item of content. By presenting different representations of restricted content (e.g., different representations of the content) to each of the computing devices, the social networking system server(s) 802 mitigates bullying by allowing the victim to control or limit the extent to which objectionable content posted by a bully about the victim is visible to the victim and/or third parties.

In some examples, the second user may attempt to tag, mention, or otherwise identify or associate the first user with a post in the second user's newsfeed, story, or the like. In that case, at operation 914, the social networking system may receive, from the second computing device associated with the second user account, input comprising at least a portion of an identifier (e.g., user ID, handle, hashtag, etc.) of an account of the first user. Because the second user has been restricted by the first user, the social networking system may apply friction to make it more difficult for the second user (the restricted user) to tag or mention the first user. This friction may take the form of applying a higher threshold level of similarity (e.g., 90% similar, 95% similar, 100% similar or matching) between the entered text and the user account identifier of the restricting user (e.g., the first user in this example). Thus, the social networking system may, at operation 916, determine whether the input meets a threshold level of similarity to the identifier of the first user.

If, at operation 916, the input is determined not to meet the threshold level of similarity, at operation 918, the social networking system may output one or more candidate accounts omitting the account of the first user. For instance, interface 600a shown in FIG. 6A illustrates an example in which the input is not sufficiently similar (e.g., is less than the similarity threshold) to the identifier of the first user account (the restricting user account).

If, on the other hand, the input is determined at operation 916 to meet or exceed the threshold level of similarity, at operation 920, the social networking system may output one or more candidate accounts including the account of the first user. However, in this example, the social networking system may down weight the user account of the first user in the candidate results. FIG. 6B illustrates an example interface 600b in which the input is sufficiently similar (e.g., meets or exceeds the similarity threshold) to the identifier of the account of the first user (restricting user account). Thus, in this way, the social networking system applies friction to make it more difficult for restricted users to tag or mention the users that have restricted them (the restricting users).

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 902-912 may be performed without operations 914-920 and/or operations 902 and 914-920 may be performed without operations 904-912. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, from a first computing device associated with a first user account, a request to restrict presentation of content having a characteristic and received from a second user account;
   receiving, from a second computing device associated with the second user account, an item of content having the characteristic;
   sending, to the first computing device associated with the first user account and based at least in part on the request to restrict presentation, a first instruction to present a first representation of the item of content; and
   sending, to the second computing device associated with the second user account, a second instruction to present a second representation of the item of content, the second representation of the item of content being different than the first representation of the item of content.

2. The method of claim 1, wherein the characteristic comprises being at least one of associated with or addressed to the first user account.

3. The method of claim 1, wherein the first representation of the item of content comprises an indication of existence of the item of content and a control usable to cause presentation of the item of content by the first computing device.

4. The method of claim 1, wherein the second representation of the item of content represents the item of content as though visible to one or more other user accounts.

5. The method of claim 1, wherein the item of content comprises a comment by the second user account associated with another item of content published by the first user account.

6. The method of claim 5, further comprising sending, to the first computing device, an instruction to present a selectable control usable to at least one of approve or disapprove the comment.

7. The method of claim 6, further comprising:
   receiving, from the first computing device, an indication of selection of the selectable control to disapprove the comment; and
   based at least in part on receiving the indication of selection of the selectable control to disapprove the comment, at least one of:
     sending, to the first computing device, an instruction to cease presenting the first representation of the item of content; or
     refraining from sending the second representation of the item of content to a third computing device associated with a third user account.

8. The method of claim 6, further comprising:
   receiving, from the first computing device, an indication of selection of the selectable control to approve the comment; and
   based at least in part on receiving the indication of selection of the selectable control to approve the comment, at least one of:
     sending, to the first computing device, an instruction to present the second representation of the item of content; or
     sending, to a third computing device associated with a third user account, an instruction to present the second representation of the item of content.

9. A system comprising:
   one or more processors; and
   computer readable media storing instructions that, when executed by the one or more processors, cause the system to:
     receive, from a first computing device associated with a first user account, a request to restrict presentation of content having a characteristic and received from a second user account;
     receive, from a second computing device associated with the second user account, an item of content having the characteristic;
     send, to the first computing device associated with the first user account and based at least in part on the request to restrict presentation, a first instruction to present a first representation of the item of content; and
     send, to the second computing device associated with the second user account, a second instruction to present a second representation of the item of content, the second representation of the item of content being different than the first representation of the item of content.

10. The system of claim 9, wherein the item of content comprises a message from the second user account to the first user account.

11. The system of claim 10, wherein the first instruction to present the first representation of the item of content comprises an instruction to present an indication of existence of the message in a secondary inbox.

12. The system of claim 11, the instructions further causing the system to:
receive, from the first computing device, a request to view the message; and
send, to the first computing device, an instruction to present:
the message; and
a control usable to at least one of:
unrestrict presentation of content received from the second user; or
delete the message.

13. The system of claim 12, the instructions further causing the system to refrain from sending, to the second computing device, a notification that the message has been presented at the first computing device.

14. One or more non-transitory computer readable media storing instructions that, when executed by one or more processors of a computing device, cause the computing device to:
receive, from a first computing device associated with a first user account, a request to restrict presentation of content having a characteristic and received from a second user account;
receive, from a second computing device associated with the second user account, an item of content having the characteristic;
send, to the first computing device associated with the first user account and based at least in part on the request to restrict presentation, a first instruction to present a first representation of the item of content; and
send, to the second computing device associated with the second user account, a second instruction to present a second representation of the item of content, the second representation of the item of content being different than the first representation of the item of content.

15. The one or more non-transitory computer readable media of claim 14, wherein the item of content comprises a comment by the second user account associated with another item of content published by the first user account.

16. The one or more non-transitory computer readable media of claim 14, wherein the first representation of the item of content comprises an indication of existence of the item of content and a control usable to cause presentation of the item of content by the first computing device.

17. The one or more non-transitory computer readable media of claim 14, wherein the second representation of the item of content represents the item of content as though visible to one or more other user accounts.

18. The one or more non-transitory computer readable media of claim 14, the instructions further causing the computing device to:
receive, from the second computing device, input comprising a portion of an identifier of the first user account;
determine that the portion of the identifier of the first user account is less than a threshold level of similarity to the identifier of the first user account; and
output, based at least in part on the portion of the identifier of the first user account being less than the threshold level of similarity, one or more candidate user accounts, the one or more candidate accounts omitting the first user account.

19. The one or more non-transitory computer readable media of claim 18, wherein the threshold level of similarity is based at least in part on the request to restrict presentation of content having the characteristic.

20. The one or more non-transitory computer readable media of claim 14, the instructions further causing the computing device to:
receive, from the second computing device, input comprising a portion of an identifier of the first user account;
determine that the portion of the identifier of the first user account meets or exceeds a threshold level of similarity to the identifier of the first user account; and
output, based at least in part on the portion of the identifier of the first user account meeting or exceeding the threshold level of similarity, one or more candidate user accounts including the first user account.

\* \* \* \* \*